United States Patent [19]

Lipinski et al.

[11] Patent Number: 5,408,966
[45] Date of Patent: Apr. 25, 1995

[54] SYSTEM AND METHOD FOR SYNCHRONOUSLY ACTIVATING CYLINDERS WITHIN A VARIABLE DISPLACEMENT ENGINE

[75] Inventors: Daniel J. Lipinski, Livonia; Julian A. LoRusso, Grosse Ile; Jerry D. Robichaux, Southgate, all of Mich.

[73] Assignee: Ford Motor Company, Dearborn, Mich.

[21] Appl. No.: 172,350

[22] Filed: Dec. 23, 1993

[51] Int. Cl.$^6$ ............................................. F02B 77/00
[52] U.S. Cl. ................................. 123/198 F; 123/481
[58] Field of Search ........................... 123/198 F, 481

[56] References Cited

U.S. PATENT DOCUMENTS

| | | | |
|---|---|---|---|
| 4,040,395 | 8/1977 | Demetrescu | 123/198 F |
| 4,144,864 | 3/1979 | Kato et al. | 123/198 F |
| 4,188,933 | 2/1980 | Iizuka | 123/198 F |
| 4,224,920 | 9/1980 | Sugasawa et al. | 123/198 F |
| 4,354,471 | 10/1982 | Sugasawa et al. | 123/198 F |
| 4,484,551 | 11/1984 | Choma et al. | 123/336 |
| 4,494,502 | 1/1985 | Endo et al. | 123/198 F |
| 4,509,488 | 4/1985 | Forster et al. | 123/198 F |
| 4,541,387 | 9/1985 | Morikawa | 123/198 F |
| 4,550,704 | 11/1985 | Barho et al. | 123/198 F |
| 4,552,114 | 11/1985 | Sano et al. | 123/198 F |
| 4,556,026 | 12/1985 | Masuda et al. | 123/198 F |
| 4,655,187 | 4/1987 | Gravestock | 123/198 F |
| 4,708,108 | 11/1987 | Sakamoto et al. | 123/198 F |
| 4,722,411 | 2/1988 | Ohashi et al. | 123/336 |
| 4,870,934 | 10/1989 | Vanetta et al. | 123/336 |
| 4,962,740 | 10/1990 | Fujimoto et al. | 123/481 |
| 4,976,228 | 12/1990 | Kawamura | 123/198 F |
| 5,035,220 | 7/1991 | Uchinami et al. | 123/481 |
| 5,042,444 | 8/1991 | Hayes et al. | 123/198 F |
| 5,099,816 | 3/1992 | Ohga | 123/198 F |
| 5,113,823 | 5/1992 | Iriyama | 123/361 |
| 5,119,781 | 6/1992 | Trombley et al. | 123/481 |
| 5,124,922 | 6/1992 | Akiyama | 123/336 |
| 5,190,013 | 3/1993 | Dozier | 123/198 F |
| 5,213,081 | 5/1993 | Fujimoto | 123/481 |

FOREIGN PATENT DOCUMENTS 404041944A 2/1992 Japan .

OTHER PUBLICATIONS

"4,6,8 . . . Which Cylinder Shall We Operate ?", MO-TOR, Jun. 25, 1983, pp. 52–53.
D. Stojek and D. Bottomley, "The Ford 3×6 Engine", Proceedings IMech vol. 198D, No. 15, 1984.
G. Berta, M. Troilo, "Cylinder Shut-off and Pressure Charging for Lower Fuel Consumption", SAE 82072.
K. Schellman and W. Schmid, "Possibilities by Saving Fuel by Switching Off Cylinders", Fuel Economy Research Conference, Unknown data & location.
T. Fukui, T. Nakagami, H. Endo, T. Katsumoto and Y. Danno, "Mitsubishi Orion–MD, A New Variable Displacement Engine," SAE 831007 Jun. 1983.
B. Bates, J. Dosdall and D. Smith, "Variable Displacement by Engine Valve Control", SAE Paper 780145, 1978.
"Mitsubishi has variable 2 or 4-cylinder engine", Wards Engine and Vehicle Technology Update, Sep. 1, 1992.
"Mitsubishi unveils new fuel savings engine", recent article in Automotive News, Aug.-Sep. 1992.

Primary Examiner—Noah P. Kamen
Attorney, Agent, or Firm—Jerome R. Drouillard; Roger L. May

[57] ABSTRACT

A system for synchronously activating cylinders of a multicylinder, fuel injected, four stroke cycle internal combustion engine, includes a valve operator for deactivating intake and exhaust valves associated with the cylinders and a controller for selecting a cylinder to be deactivated, as well as a timing mechanism for determining when the selected cylinder is operating during intake events. The controllers directs the valve operator to begin deactivating the valves of a selected cylinder during a predetermined intake event, with the valve operator completing the deactivation by a time not later than the beginning of the next exhaust event.

11 Claims, 2 Drawing Sheets

5,408,966

SYSTEM AND METHOD FOR SYNCHRONOUSLY ACTIVATING CYLINDERS WITHIN A VARIABLE DISPLACEMENT ENGINE

BACKGROUND OF THE INVENTION

This invention relates to a system for controlling a multi-cylinder variable displacement internal combustion engine so as to manage the deactivation and reactivation of cylinders within the engine.

DESCRIPTION OF THE PRIOR ART

Automotive vehicle designers and manufacturers have realized for years that it is possible to obtain increased fuel efficiency if an engine can be operated on less than the full complement of cylinders during certain running conditions. Accordingly, at low speed, low load operation, it is possible to save fuel if the engine can be run on four instead of eight cylinders or three, instead of six cylinders. In fact, one manufacturer offered a 4-6-8 variable displacement engine several years ago, and Ford Motor Company designed a 6-cylinder engine capable of operation on only three cylinders which, although never released for production, was developed to a highly refined state. Unfortunately, both of the aforementioned engines suffered from deficiencies associated with their control strategies. Specifically, customer acceptance of the engine system actually in production was unsatisfactory because the powertrain tended to "hunt" or shift frequently between the various cylinder operating modes. In other words, the engine would shift from four to eight cylinder operation frequently, while producing noticeable torque excursions. This had the undesirable effect of causing the driver to perceive excessive changes in transmission gear in the nature of downshifting or upshifting. Another drawback to prior art systems resided in the fact that the engine emissions were not properly controlled because the fuel injection and valve timing could not be properly controlled.

It is an object of the present invention to provide a system for operating an engine's intake and exhaust valves so as to accomplish transitions between maximum operation with all cylinders activated and fractional operation with only some of the cylinders activated, without causing excessive exhaust emissions, and with maximum gains in engine efficiency. Efficiency is promoted with the present system because exhaust gas is trapped in the deactivated cylinders; this gas is alternately compressed and expanded during subsequent cycles, with the result that very little energy is lost.

SUMMARY OF THE INVENTION

A system for synchronously activating one or more of the cylinders of a multicylinder, fuel injected, four stroke cycle internal combustion engine includes valve operator means for deactivating intake and exhaust valves associated with the cylinder, a plurality of fuel injectors, with one of the injectors being associated with each of said cylinders, and control means, including means for selecting a cylinder to be deactivated and timing means for determining when the selected cylinder is operating during intake events. The control means directs the valve operator means to begin deactivating the valves of a selected cylinder during a predetermined intake event, with the valve operator completing the deactivation by a time not later than the beginning of the next exhaust event. The control means preferably directs the valve operator means to begin deactivating the valves at approximately the beginning of the intake stroke of any selected cylinder.

According to another aspect of the present invention, the control means may further include means for deactivating a fuel injector associated with a selected cylinder when the selected cylinder has finished a predetermined intake event in which the valves are deactivated. A system according to the present invention deactivates successive cylinders such that each deactivated cylinder will be filled with exhaust gas from its final power stroke.

During cylinder reactivation, the valve operator means begins reactivating a selected cylinder during the time an intake event would occur if the intake valve were operational, with the valve operator completing the reactivation by a time not later than the beginning of the next exhaust event.

A method for synchronously activating the cylinders of an engine according to the present invention includes the steps of selecting a cylinder to be activated, determining when the selected cylinder is operating during an intake event if the cylinder were activated, directing a valve operator to begin activating the selected cylinder during a predetermined intake event, with the valve operator completing the activation by a time not later than the beginning of the next exhaust event, and activating a fuel injector associated with the selected cylinder before the selected cylinder has begun the first intake event.

DETAILED DESCRIPTION OF THE PREFERRED EMBODIMENTS

Figure 1:
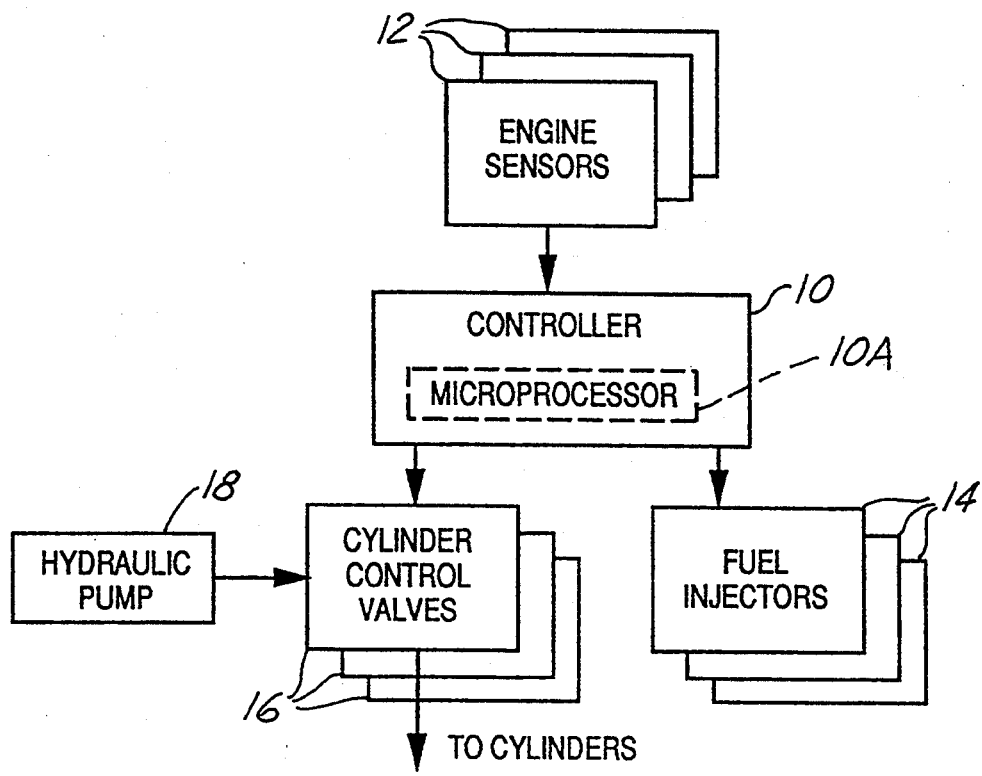
FIG. 1 is a block diagram of a synchronous cylinder activation system according to the present invention.
Figure 2:
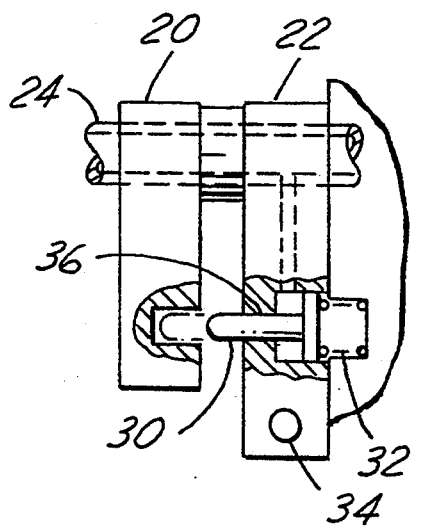
FIGS. 2 and 3 illustrate a portion of a valve operator means which is useful for implementation of a system according to the present invention.
Figure 3:
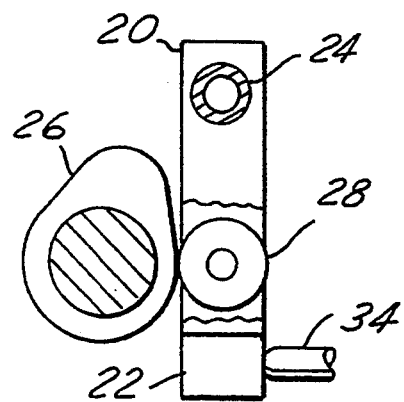

As shown in FIG. 1, a system for synchronously activating cylinders of a four stroke cycle internal combustion engine according to the present invention includes microprocessor controller 10 of the type commonly used to provide engine control. Controller 10 contains microprocessor 10A, which uses a variety of inputs from various sensors, such as sensors 12, which may include engine coolant temperature, air charge temperature, engine mass airflow, intake manifold pressure, accelerator pedal position, engine speed, and other engine and vehicle sensors known to those skilled in the art and suggested by this disclosure. Controller 10 operates fuel injectors 14 and cylinder control valves 16. Each of the engine's eight cylinders has a discrete cylinder control valve 16, which serves to operate all of the popper valves associated with the one particular cylinder. Thus, although FIGS. 2 and 3 show but a single valve stem 34, and its associated control mechanism, it is understood that the mechanism of FIGS. 2 and 3 will be replicated as for each of the valves associated with any particular cylinder. Because a separate cylinder control valve 16 is used for each cylinder, the valves may be selectively deactivated, thereby allowing each cylinder to be controlled separately. Controller 10 has the capability of disabling selected cylinders in the engine so as to cause the engine to have a reduced effective displacement. For example, with an eight-cylinder engine, the engine may be operated on 4, 5, 6 or 7 cylinders, or even 3 cylinders, as required. Those skilled in the art will appreciate in view of this disclosure that a number of different disabling devices are available for selectively rendering the cylinders of the engine inoperative. Such devices include mechanisms for preventing any of the valves from opening in the disabled cylinders, such that burnt, or exhaust, gas remains trapped within the cylinder. Such devices may also include mechanisms for altering the effective stroke of one or more cylinders.

FIGS. 2 and 3 illustrate one mechanism for disabling, or deactivating, selected cylinders. In effect, rocker arm 22, which is operatively associated with valve stem 34, which may be part of either an intake valve or an exhaust valve, responds to the urgings of cam lobe 26 only when hydraulic camshaft follower 20, which is mounted to a common rocker shaft 24, is engaged with rocker arm 22, which occurs when spring loaded pin 30 is projected from rocker arm 22 into follower 20. Pin 30 responds to hydraulic pressure from one of cylinder control valves 16, which valve corresponds to the selected cylinder. Upon receipt of a command from controller 10, the appropriate cylinder control valve will route high pressure hydraulic oil from hydraulic pump 18 to a pair of rocker arms 22 corresponding to the selected cylinder. Then, pins 30 will be retracted into the corresponding rocker arms 22 and the valves for the selected cylinder will be deactivated. When any particular cylinder control valve 16 is turned off, the hydraulic pressure forcing pin 30 into its retracted position within rocker arm 22 will decay and spring 32 will cause follower 20 and rocker arm 22 to become engaged, with the result that the cylinder will become activated. Those skilled in the art will appreciate in view of this disclosure that an engine having two valves per cylinder will require two cam followers 20; engines having more than two valves will require additional cam followers for each cylinder. Those skilled in the art will further appreciate that pins 30 could be projected to the cam follower engaging position by means of hydraulic pressure and retracted by spring force.

Figure 4A:
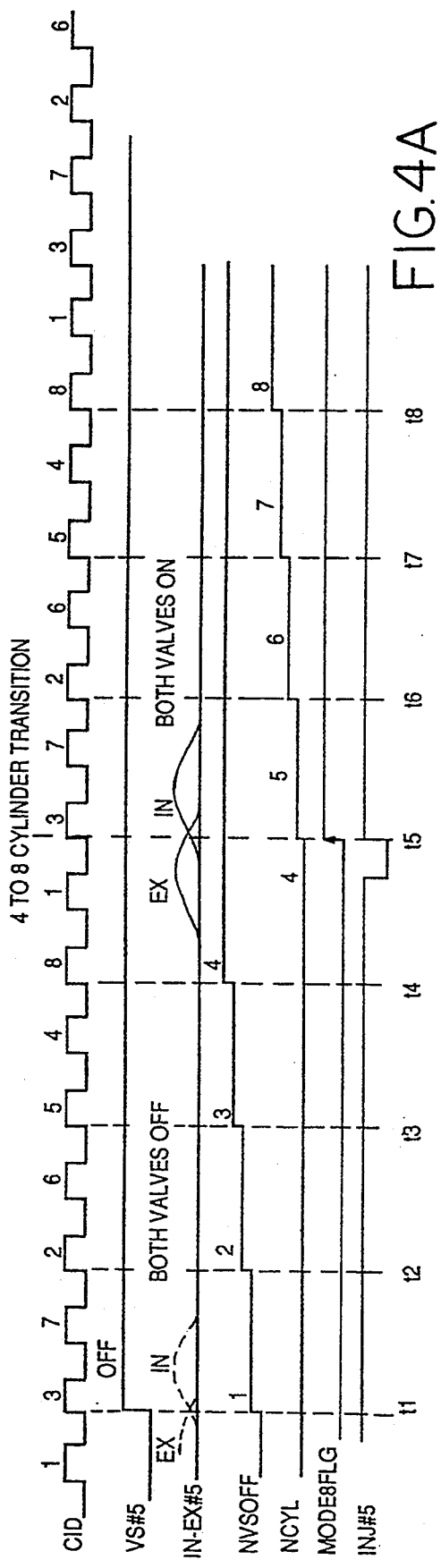
FIGS. 4A and 4B are a graphical representation of the behavior of several engine control parameters during a transition from operation with four activated cylinders to eight activated cylinders (FIG. 4A) in an eight cylinder engine operated according to the present invention. The behavior of the identical parameters is also shown for a transition from operation with eight activated cylinders to four activated cylinders (FIG. 4B).

FIG. 4 illustrates various engine operating parameters during a transition from fractional operation with, in this case, four activated cylinders, to maximum operation with eight activated cylinders, and vice versa. Beginning with FIG. 4A, the line labeled "CID" shows the various engine cylinders in firing sequence. The leading edge of each pulse corresponds to about 10° BTDC (before top dead center) on the compression stroke for the numbered cylinder. The line labeled "VS#5" shows the condition of the cylinder control valve corresponding, in this example, to cylinder number five. Those skilled in the art will appreciate in view of this disclosure that the cylinder chosen for initiation of any particular activation or deactivation sequence may be selected so as to minimize the number of engine cycles which occur prior to completion of the change in the number of active cylinders. Thus, the choice of cylinder five for the examples herein is merely one of convenience. The line labeled "IN-EX#5 shows the operational condition of the intake and exhaust valves for cylinder five. The line labeled "NVS OFF" shows the number of cylinder control valves 16 which have been de-energized, so as to activate the valves associated with the various cylinders. Line "NCYL" indicates the number of activated, or firing, cylinders. The line labeled "MODE8FLG" shows whether the engine is operating according to a four or eight cylinder firing frequency. Finally, the line labeled "INJ#5 indicates operation of the injector for cylinder five.

In the present example, an eight cylinder engine runs at either maximum operation with all eight cylinders activated, or minimum operation with four cylinders. The cylinders which may be deactivated are numbers 5, 8, 3, and 2. As noted above, this range of deactivation is only an example, and the present invention may be employed to activate and deactivate any number of cylinders within an engine.

Beginning now with the four to eight cylinder transition shown in FIG. 4A, at time $t_1$ a command is given by processor 10A to activate additional cylinders of the engine, beginning with cylinder five. It should be noted that time $t_1$ coincides with the CID pulse for cylinder three. The command is given at time $t_1$ because as cylinder three approaches top dead center on its compression stroke, cylinder five, which is exactly 360° out of phase with cylinder three, has started its intake events, including the intake stroke. Accordingly, the CID line allows processor 10A to determine when the various cylinders are undergoing their intake events. In this case, however, the exhaust and intake valves for cylinder five are deactivated at time $t_1$, as shown in the IN-EX#5 line. In terms of hardware activity at time $t_1$, line VS#5 shows that the cylinder control valve 16 for cylinder number five is turned off so that pins 30 within followers 20 for cylinder five will be driven into their respective rocker arms 22 by springs 32, with the result that by time $t_5$, both the intake and exhaust valves associated with cylinder five will be activated, as shown in the IN-EX#5 line. In effect, the reactivation begins during the time an intake event would occur if the intake valve were operational; the reactivation is completed by a time not later than the beginning of the next exhaust event.

The NVS OFF line shows that at time $t_1$ one additional cylinder control valve, which in this example comprises the control valve for cylinder five, is on. Controller 10 reactivates successive cylinders so that each reactivated cylinder will draw a fresh, uncontaminated charge during its first intake stroke. This occurs because the exhaust valve for each cylinder is always deactivated and reactivated before the intake valve deactivations and reactivations. Exhaust emission control is aided because the cylinder first exhausts the burnt gases and then draws in a fresh charge, including fuel at the desired air/fuel ratio. The NCYL line shows that the number of activated cylinders begins increasing to eight by time $t_5$. Because the cylinders are reactivated at a rate which matches their firing frequency, the engine is actually operating at an eight cylinder firing frequency at time $t_5$, as shown in the MODE8FLG line, which has a step increase at time $t_5$.

Turning now to the control of the fuel injectors associated with the various cylinders in general, and cylinder 5 with particularity, at time $t_1$ the injector for cylinder 5 is enabled; this enablement allows the injector to fire in a short period of time prior to the following CID pulse for cylinder 3. In this manner, fuel will be available for induction into cylinder 5 when the intake and exhaust valves have been reactivated at time $t_5$. Note that because the reactivation of the injector occurs prior to the intake event following the first reactivated exhaust event, the cylinder is able to fire normally, and this means that a chemically correct exhaust mixture is discharged into the exhaust system. This is important because if the cylinder were to discharge only air, the exhaust aftertreatment system could be upset.

Figure 4B:
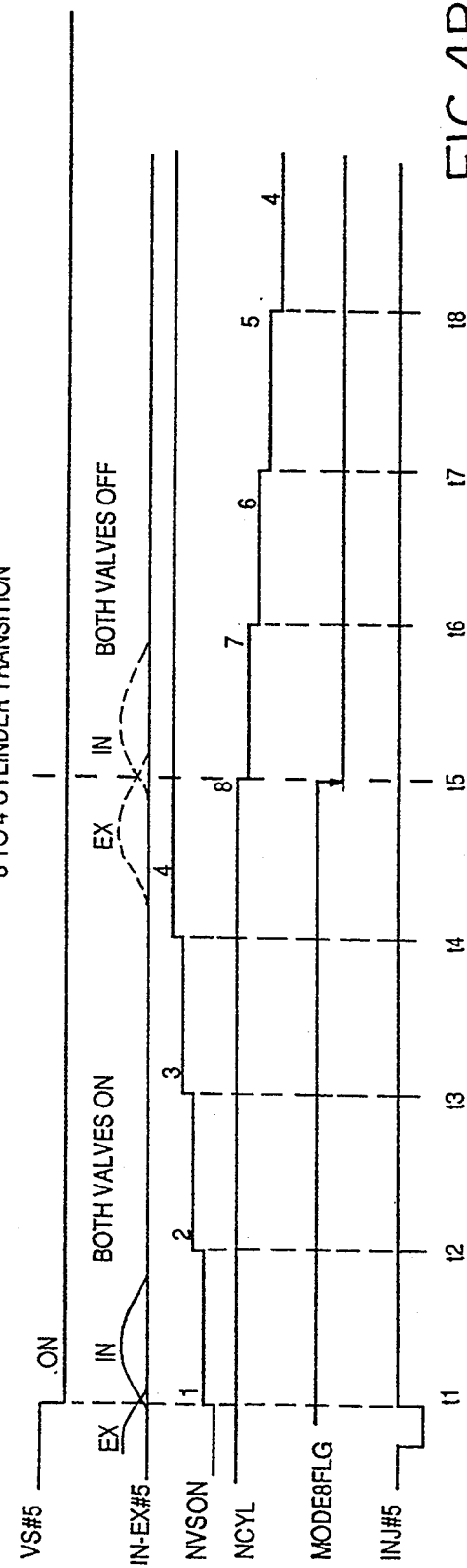

The eight to four cylinder transition illustrated in FIG. 4B shows that the transition from maximum operation with eight activated cylinders to fractional operation with, in this case, four activated cylinders, begins at time $t_1$, with the command on the VS#5 line to turn on the cylinder control valve for cylinder five. As shown on line IN-EX#5, the intake and exhaust valves for cylinder five are deactivated by time $t_5$. In a manner which is analogous to the reactivation, the deactivation proceeds through the engine firing order and, as shown in the NVS ON line, the cylinder control valves for cylinders eight, three, and two are turned on at times $t_2$, $t_3$, and $t_4$, respectively. At time $t_5$, the valves for cylinder 5 are on, and the NCYL line shows that the number of activated cylinders begins decreasing to four by time $t_5$. The MODE8FLG line shows that the engine has reached a four cylinder firing frequency by time $t_5$. Finally, at time $t_1$, the injector for cylinder five is disabled. The injectors associated with the other cylinders to be deactivated are disabled in firing order sequence such that their disablement occurs by the time the intake event has been completed. Note however, that because the deactivated cylinders draw one final fresh charge, including air and fuel, the cylinder is able to fire with a chemically correct mixture, as determined by controller 10. This means that the exhaust gases which are discharged when the cylinder is reactivated will have the composition desired for aftertreatment. In the case of both deactivation and reactivation, the firing of the sparkplugs is maintained at all times—i.e., the sparkplugs are not shut off. This, too, is required to assure that only appropriate exhaust mixtures reach the exhaust aftertreatment device.

Changes and modifications may be made to the system described herein without departing from the scope of the invention as set forth in the appended claims. And, a system according to the present invention has wide applicability and could be employed to operate an eight cylinder engine at three, four, five, six, seven, or eight cylinders, or a six cylinder engine at three, four, five or six cylinders.

We claim:

1. A system for synchronously activating cylinders of a multicylinder, fuel injected, four stroke cycle internal combustion engine, comprising:
    valve operator means for selectively deactivating intake and exhaust valves associated with said cylinders;
    a plurality of fuel injectors, with one of said injectors being associated with each of said cylinders; and
    control means including means for selecting a cylinder to be deactivated and timing means for determining when the selected cylinder is operating during intake events, with said control means directing said valve operator means to begin deactivating the valves of the selected cylinder during a predetermined intake event, with the valve operator completing the deactivation by a time not later than the beginning of a next exhaust event of the selected cylinder.

2. A system according to claim 1, wherein said control means directs said valve operator means to begin deactivating said valves at approximately the beginning of the intake stroke of the selected cylinder.

3. A system according to claim 1, wherein said control means further comprises means for deactivating the fuel injector associated with the selected cylinder by the time the selected cylinder has finished the predetermined intake event.

4. A system according to claim 3, wherein said control means directs said valve operator means to begin deactivating said valves while simultaneously deactivating said fuel injector.

5. A system according to claim 1, wherein the control means deactivates successive cylinders such that each deactivated cylinder remains filled with exhaust gas from its final power stroke.

6. A system according to claim 1, wherein said control means reactivates any cylinder which has been deactivated by directing the valve operator means to begin reactivating the selected cylinder during the time an intake event would occur if the intake valve were operational, with the valve operator completing the reactivation by a time not later than the beginning of the next exhaust event.

7. A system according to claim 6, wherein said control means reactivates the fuel injector associated with the selected cylinder prior to the intake event of the selected cylinder which follows the first reactivated exhaust event.

8. A system according to claim 6, wherein the control means reactivates successive cylinders such that each reactivated cylinder will draw a fresh charge during its first intake stroke.

9. A system according to claim 1, wherein the exhaust valve of a selected cylinder is deactivated before the intake valve is deactivated, with the exhaust valve of any deactivated cylinder being reactivated before the intake valve is reactivated.

10. A method for synchronously activating the cylinders of a multicylinder, individually fuel injected, four stroke cycle internal combustion engine, comprising the steps of:
    selecting a cylinder to be deactivated;
    determining when the selected cylinder is operating during an intake event;
    directing a valve operator to begin deactivating the selected cylinder during a predetermined intake event, with the valve operator completing the deactivation by a time not later than the beginning of the next exhaust event of the selected cylinder, such that the selected cylinder remains full of exhaust gas from its final power stroke; and
    deactivating the fuel injector associated with the selected cylinder by a time not later than the time by which the selected cylinder has finished the intake event, whereby the selected cylinder will contain a mass of exhaust gas which is chemically correct for an exhaust aftertreatment device.

11. A method according to claim 10, further providing for the reactivation of any particular deactivated cylinder, by the steps of:
    selecting a cylinder to be reactivated;
    determining when the selected cylinder would be operating during an intake event if it were activated;

directing the valve operator to begin activating the selected cylinder during the time the intake event would otherwise occur, with the valve operator completing the activation by a time not later than the beginning of the next exhaust event, and activating the fuel injector associated with the selected cylinder by a time not later than the time by which the exhaust valve has been reactivated.

* * * * *